US007797070B2

(12) United States Patent
Dilbeck, Jr. et al.

(10) Patent No.: US 7,797,070 B2
(45) Date of Patent: *Sep. 14, 2010

(54) SYSTEM AND METHOD FOR THE DIGITAL SPECIFICATION OF HEAD SHAPE DATA FOR USE IN DEVELOPING CUSTOM HAIR PIECES

(75) Inventors: William W. Dilbeck, Jr., Odenville, AL (US); Cooper M. Schley, Jr., Osprey, FL (US); Michael T. Schley, Pelham, AL (US)

(73) Assignee: CenterTrak, LLC, Hoover, AL (US)

( * ) Notice: Subject to any disclaimer, the term of this patent is extended or adjusted under 35 U.S.C. 154(b) by 66 days.

This patent is subject to a terminal disclaimer.

(21) Appl. No.: 12/352,126

(22) Filed: Jan. 12, 2009

(65) Prior Publication Data

US 2009/0231336 A1    Sep. 17, 2009

Related U.S. Application Data

(63) Continuation of application No. 11/280,993, filed on Nov. 17, 2005, now Pat. No. 7,483,763.

(51) Int. Cl.
*G06F 7/48* (2006.01)
*G06F 19/00* (2006.01)
*G06F 3/033* (2006.01)
*G09G 5/00* (2006.01)

(52) U.S. Cl. .................. 700/118; 700/96; 700/120; 345/156; 345/179; 703/11

(58) Field of Classification Search ............... 703/11; 700/96, 118, 120; 345/156, 179
See application file for complete search history.

(56) References Cited

U.S. PATENT DOCUMENTS

| 2,604,104 | A | * | 7/1952 | Perlin | ............... 132/53 |
| 2,907,334 | A | * | 10/1959 | Le Mole | ............... 132/201 |
| 4,872,056 | A | | 10/1989 | Hicks et al. | |
| 5,724,264 | A | * | 3/1998 | Rosenberg et al. | ......... 702/152 |
| 6,034,698 | A | | 3/2000 | Yasuda | |
| 6,141,431 | A | | 10/2000 | Munetdugu et al. | |
| 6,405,095 | B1 | * | 6/2002 | Jang et al. | ............... 700/118 |
| 6,549,819 | B1 | | 4/2003 | Danduran et al. | |
| 7,348,973 | B1 | | 3/2008 | Gibbs et al | |

(Continued)

FOREIGN PATENT DOCUMENTS

WO    2006/047542    5/2006

OTHER PUBLICATIONS

Search Strategies (search conducted by EIC); 7 pages; printed on Nov. 27, 2009.*

(Continued)

*Primary Examiner*—Ronald D Hartman, Jr.
(74) *Attorney, Agent, or Firm*—Banner & Witcoff, Ltd.

(57) ABSTRACT

The present invention is a system and method for specifying custom hair pieces using three-dimensional digital acquisition devices. The system and method described herein uses electronic data acquisition techniques to electronically model a customer's head and hair line characteristics and to electronically record specifications for a custom hair piece. The electronic data containing certain head shape data and hair piece specifications is then electronically transmitted to a hair piece manufacturer for completion of the hair piece.

14 Claims, 5 Drawing Sheets

U.S. PATENT DOCUMENTS

| | | |
|---|---|---|
| 2002/0024528 A1 | 2/2002 | Lambertsen |
| 2002/0150287 A1 | 10/2002 | Kobayashi |
| 2003/0028347 A1* | 2/2003 | D'Hooge et al. ............ 702/152 |
| 2003/0133628 A1 | 7/2003 | Lee |
| 2003/0160827 A1 | 8/2003 | Hirata et al. |
| 2003/0187747 A1 | 10/2003 | Fukasawa et al. |
| 2004/0225522 A1 | 11/2004 | McCaig et al. |
| 2006/0188144 A1 | 8/2006 | Sasaki et al. |
| 2006/0251319 A1* | 11/2006 | Franich et al. .............. 382/154 |
| 2007/0265867 A1 | 11/2007 | Lin |
| 2008/0011313 A1 | 1/2008 | Gildenberg |

OTHER PUBLICATIONS

Patent Full Text (search conducted by EIC); 42 pages; printed on Nov. 27, 2009.*

Patent Abstracts (search conducted by EIC); 16 pages; printed on Nov. 27, 2009.*

NPL Full Text (search conducted by EIC); 6 pages; printed on Nov. 27, 2009.*

NPL Abstracts (search conducted by EIC); 5 pages; printed on Nov. 27, 2009.*

EIC Search Request (submitted to EIC by examiner of record); received on Nov. 24, 2009; 2 pages; printed Nov. 24, 2009.*

* cited by examiner

SYSTEM AND METHOD FOR THE DIGITAL SPECIFICATION OF HEAD SHAPE DATA FOR USE IN DEVELOPING CUSTOM HAIR PIECES

This application is a continuation of U.S. patent application Ser. No. 11/280,993, filed Nov. 17, 2005, the entire disclosure of which is hereby incorporated by reference.

FIELD OF THE INVENTION

This invention relates to the design of custom hair pieces. More particularly, this invention relates to a system and method for the specification of custom hair pieces using three-dimensional digital acquisition devices.

BACKGROUND OF THE INVENTION

Hair replacement systems, such as custom hair pieces, are important to many individuals that will lose, are losing, or have lost naturally growing hair. Preparing such systems can be time-intensive because custom hair pieces typically must be personally configured to fit a particular individual's head and area(s) of hair loss. Presently, businesses that offer custom hair replacement systems manually design and specify hair pieces intended to cover areas of a specific customer's head by creating a mold template of the customer's head and outlining the specific areas to be covered before actually building the specified hair piece.

To build a hair piece using the known methods, first, the customer's head, or relevant portions thereof, is tightly wrapped in a plastic wrap, or alternatively a "mold cap" designed for this purpose, which is then covered in sufficient adhesive tape or other similar means as to enable the wrapping to retain the shape of the head when removed. Next, the area to be covered by the hair piece is outlined on the head covering using an ink-based marker, and other instructions related to hair color, pattern, texture and other necessary data are marked as appropriate. The head covering is then removed and the excess is trimmed, resulting in a mold template.

The mold template, along with a completed paper form with any additional information and specifications, including identifying data, is sent by package-delivery, either directly to a remote factory or, more commonly, to an intermediary distributor who then sends the information to a factory for the manufacture of the final product.

This method, while it has been in use for many years, entails significant expense in shipping, and can result in delays before the instructions get to the manufacturer, ultimately delaying delivery to a customer. Delays in customs and occasional losses of packages by shipping companies are also hazards of this method. Further, templates prepared by this method can represent a storage burden and can be sufficiently imprecise as to cause or allow imperfections in the shape of the final product, necessitating remanufacturing, causing additional delays and expense.

The need exists in the art for a system and method of creating custom hair pieces that cuts down on delay, and is more precise than the previous systems and methods.

SUMMARY OF THE INVENTION

Aspects of the present invention address some of the needs described above by providing an electronic system and method of specifying and designing custom hair pieces. By utilizing electronic data acquisition techniques to acquire information about and model a customer's head, the specifications of a custom hair piece can be electronically recorded and transmitted to a hair piece manufacturer.

In one embodiment of the invention, an electronic stylus-based device is used to acquire data about a customer's head size and shape and to trace the outlines of the area(s) to be covered by the hair piece. The resulting data is then captured by a computer and used to build a three-dimensional representation of the customer's head, and ultimately to electronically specify the areas(s) to be covered by the hair piece. Using specially-designed software, the computer generates an electronic file based on all of the data related to the customer's head and hair loss characteristics in order to manufacture a custom hair piece. The electronic file is then electronically transmitted to a manufacturing facility for manufacture of the hair piece.

A more detailed summary of the invention and exemplary embodiments can be found in the detailed description of the invention.

BRIEF DESCRIPTION OF THE DRAWINGS

The present invention is illustrated by way of example in the following figures and is not limited by the accompanying figures in which.

DETAILED DESCRIPTION OF THE INVENTION

Figure 1A:
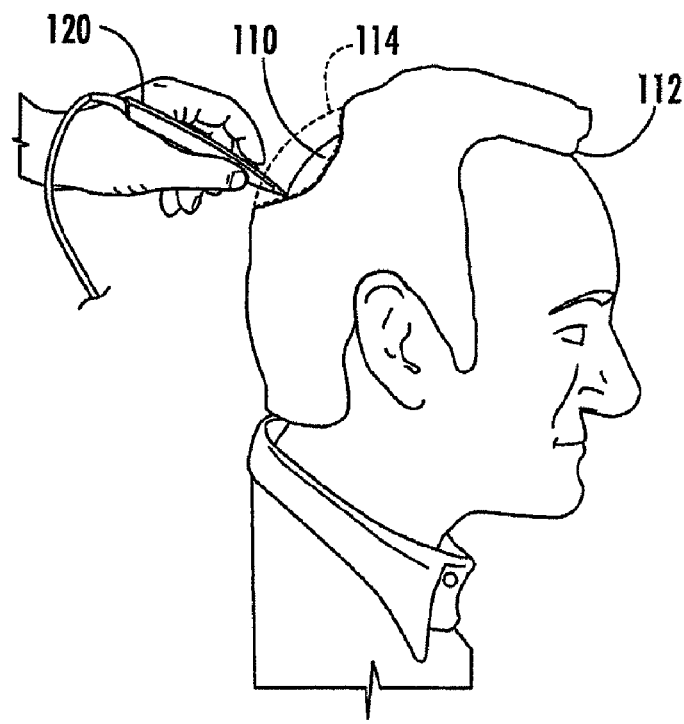
FIGS. 1A, 1B and 1C depict examples of recognizable hair lines, each with a recognizable area of hair loss.
Figure 1B:
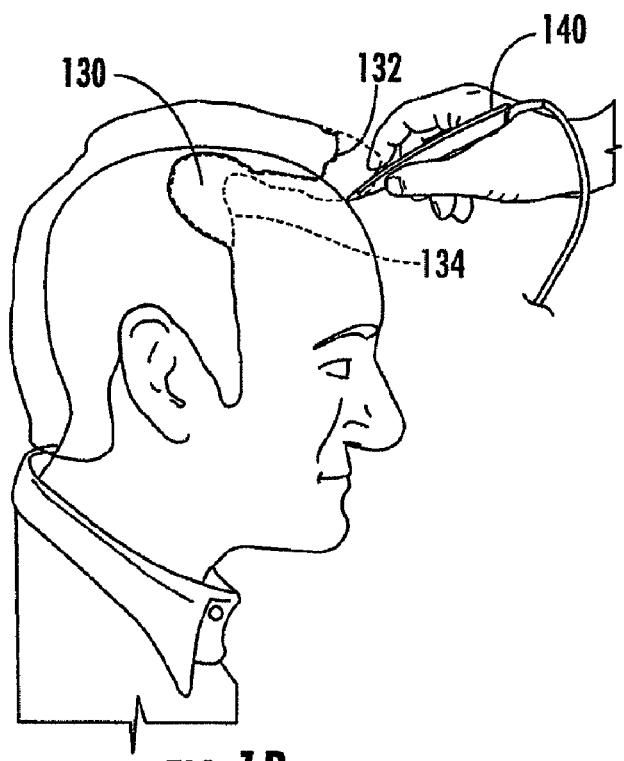
Figure 1C:
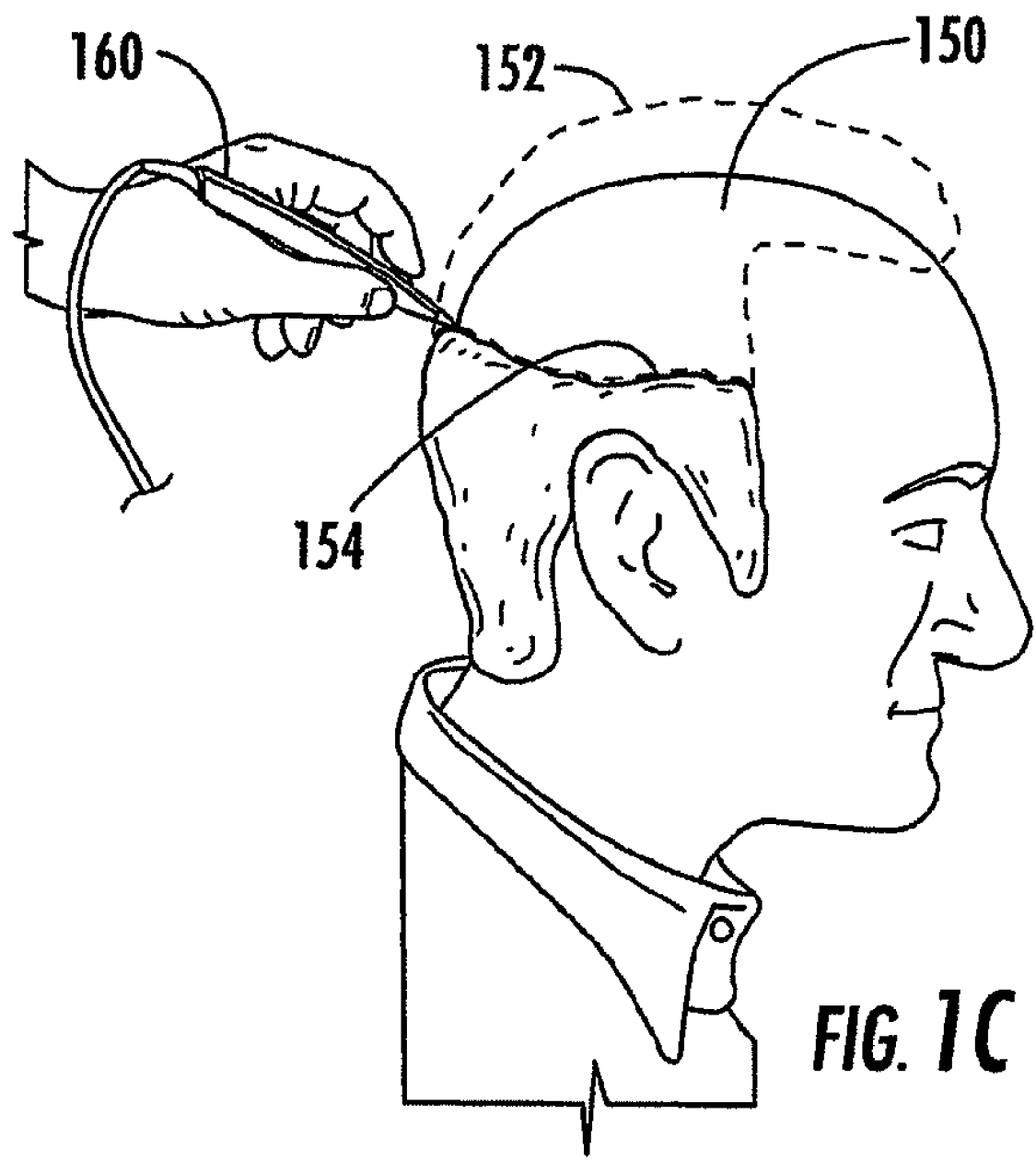

FIGS. 1A, 1B and 1C exemplify three common patterns of natural hair loss on a human head. FIG. 1A depicts a small area of hair loss 110 on the back portion of the head. FIG. 1B depicts a receding hair line 130 near the forehead, which typically exists on the right and left sides of the forehead. FIG. 1C depicts a larger area of hair loss 150 covering the top portion of the head. Individuals with the exemplified patterns of hair loss depicted in FIGS. 1A, 1B and 1C could be candidates for custom hair pieces as described herein.

Figure 2:
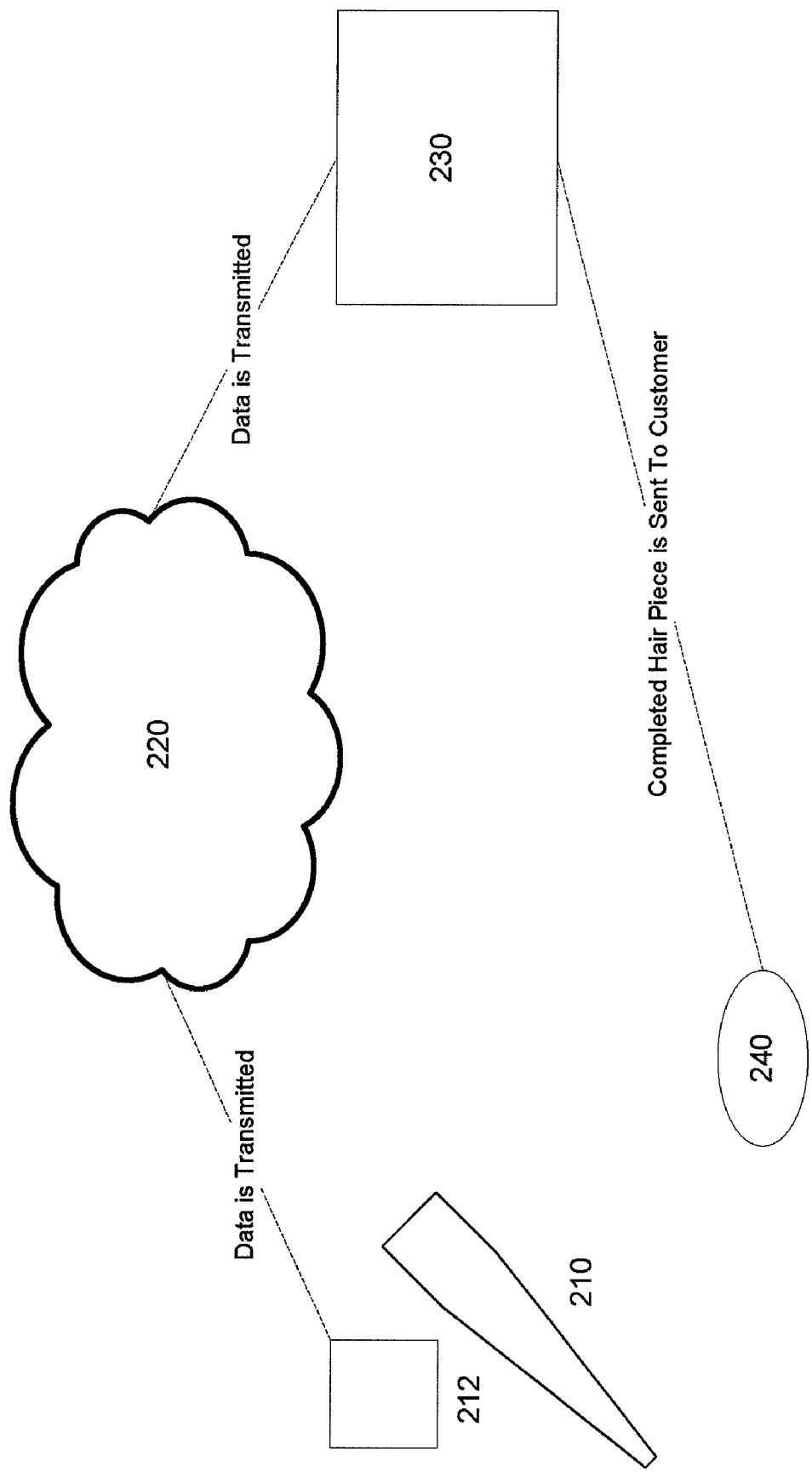
FIG. 2 depicts one embodiment of the entities involved in the disclosed method of creating a custom hair piece.

In FIG. 2, the overall process and the entities involved in creating a custom hair piece, according to aspects of the present invention, are shown. First, the hair line of a customer's head (114, 134 and 154), as well as the areas to be covered by the custom hair piece (112, 132 and 152) are traced with a device 210 that can render the data electronically and store the data in an electronic form such as a data file 212. There are commercially available devices capable of capturing three-dimensional data electronically for modeling, as depicted at 120, 140, 160 and 210. Once the head shape or hair line data, as well as the data related to the area to be covered by the hair piece is captured, the data is transmitted via an electronic network 220, such as the Internet or other wireless or dedicated network, to a facility that can manufacture the hair piece 230. The manufacturing facility completes the custom hair piece 240, and then the hair piece is sent by the manufacturer to the customer or front-end dealer that placed the order.

Figure 3:
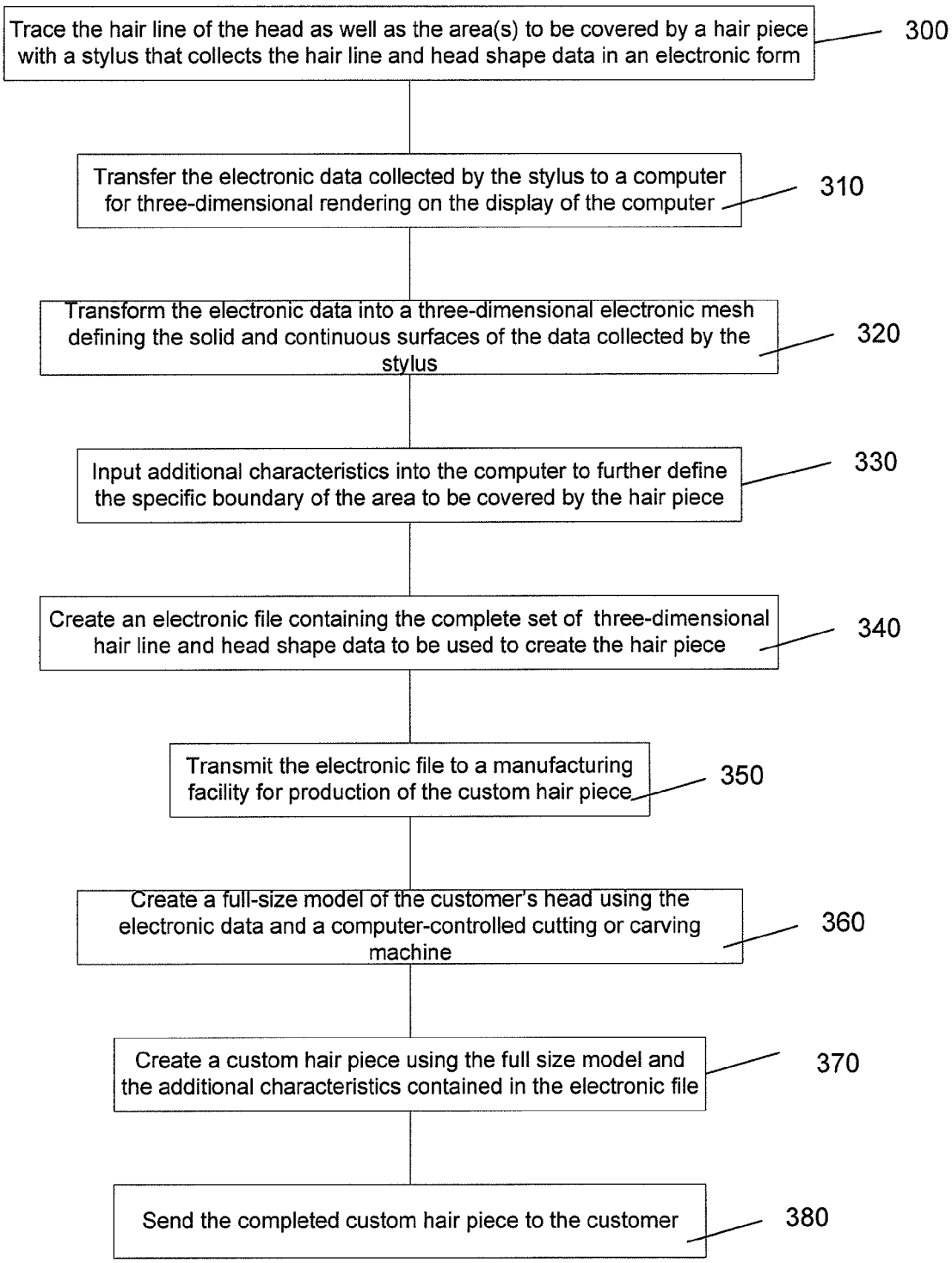
FIG. 3 depicts a flow chart of one embodiment of the disclosed method of creating a custom hair piece.

FIG. 3 is a detailed flow chart of one embodiment of the disclosed method of creating a custom hair piece. The method begins at step 300, where the hair line of the customer's head is traced with a commercially-available, stylus-based electronic device designed to capture the shape and measurements of a three-dimensional object in three-dimensional space. The areas to be covered by the custom hair piece, such as areas 110, 130 and 150 in FIG. 1, are traced with the stylus. The operator utilizes the stylus to trace the head in a manner sufficient to capture all features and shapes relevant to the definition of the area to be covered by the hair piece. The stylus collects the hair line and head shape data in an electronic form, for further rendering on the display of a computer.

In step 310, the electronic hair line and head shape data that is collected by the stylus is transferred to a computer for three-dimensional rendering on the display of the computer. These resulting data points (referred to as a "point cloud") are captured by a computer running software to convert the point cloud data into a three-dimensional representation of the area which has been scanned by the stylus. Software products that convert point cloud data into a three-dimensional representation are commercially available to those skilled in the art. The software then displays the representation on a computer display device.

Figure 4:
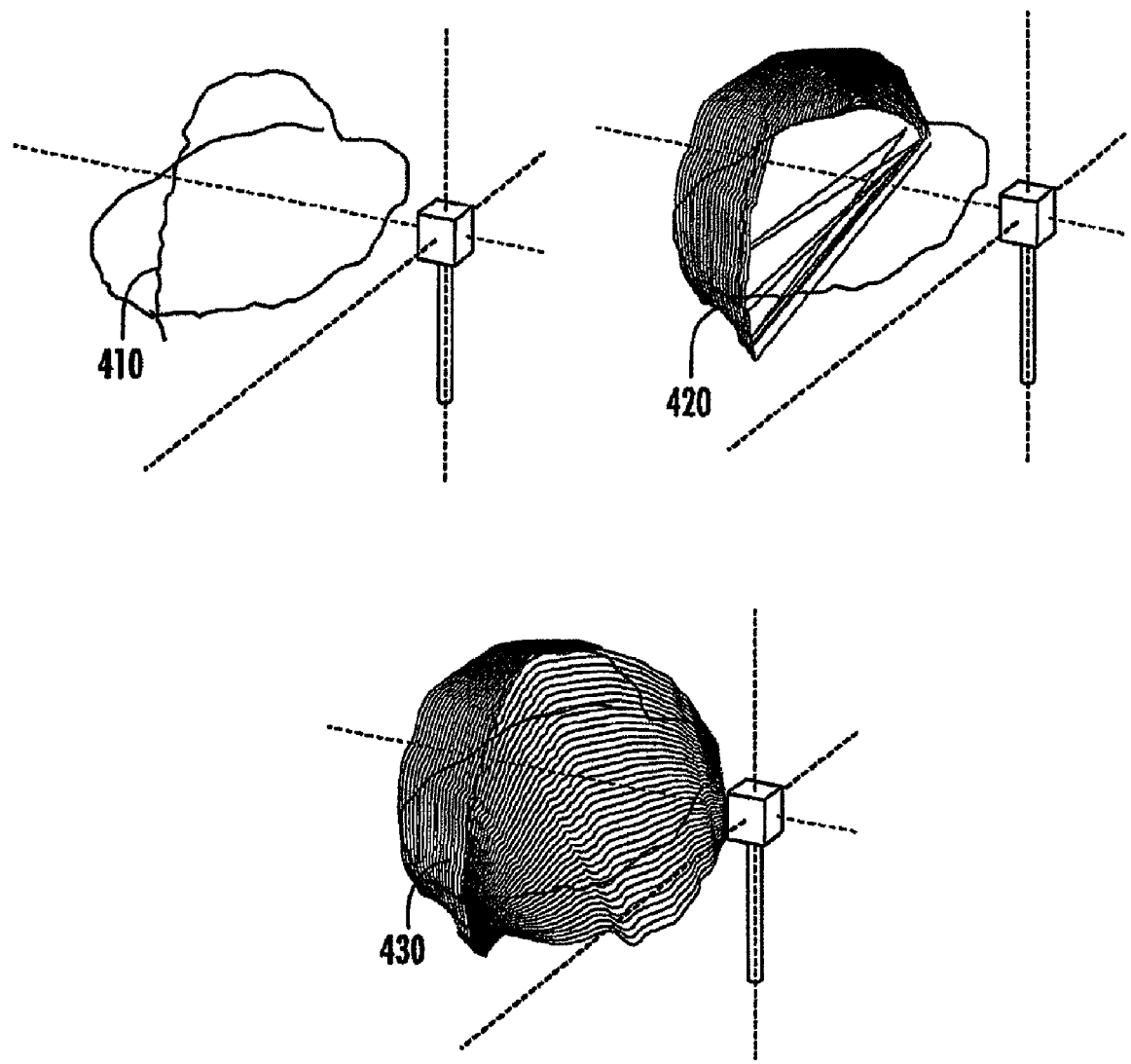
FIG. 4 depicts an example of the progression of a three-dimensional electronic depiction of a partial hair line, as captured by an electronic stylus device.

Upon completion of this initial tracing, in step 320, the computer software program next produces an interpolation of the areas between the data points called an electronic mesh which is sufficient to define a solid and continuous surface, and displays the resulting object on the screen. FIG. 4 depicts one embodiment of the progression of the electronic rendering of the head shape and hair line data captured by the stylus. In 410, an initial three-dimensional representation of the head shape and hairline data is shown. The next stage is depicted in 420 as the computer software program begins to fill in the solid and continuous surface and prepare an electronic mesh. The three-dimensional electronic mesh depicted in 430 has been fully filled in to form a solid and continuous surface.

In step 330, the operator may then continue to define or trace, by making further selections in the software, the specific boundary of the area to be covered by the hair replacement product, such area typically being a subset of the area initially traced and scanned. The area to be covered by the hair piece may also fall outside the boundaries of the natural hair line. The operator may further draw and write on the surface such other instructions and descriptions as may be necessary and desirable to complete the specifications. Any additional drawings and writings are captured by the computer software program and displayed for confirmation or correction.

At step 340, an electronic file is created by the software which contains the set of electronic data from which the custom hair piece will be created. The electronic file, along with such other instructions, specifications, and identifying information as may be necessary or desired for creation of the hairpiece, is transmitted using e-mail or other means to a manufacturing facility, or to an intermediary distributor who then transmits the file using e-mail or other means to a selected manufacturing facility, step 350. The transmission of the electronic file can be accomplished by any suitable means, including public data networks such as the Internet, a private dedicated data line, wireless communication or even standard postal mail.

In step 350, computer software at the manufacturing facility receives the electronic template file and formats the data therein so that it can be used directly by a computer-controlled cutting or carving machine located at the facility. Formatting may include adjusting the data to be read by a specific cutting machine. Once the data is in a suitable format, an electronic carving or cutting machine carves a full-size model or mold using the custom-measured data, resulting in a precise model of the customer's head, step 360. The model may then be used by the manufacturer to produce the custom-designed hair piece, to the precise specifications and measurements included in the electronic template file, step 370. Custom designed hair pieces are usually hand-sewn with human hair to recreate an authentic appearance.

In step 380, the resulting product or custom hair piece is then sent by the manufacturer directly to the distributor, dealer or customer that placed the order.

It should be noted that certain aspects of the present invention have been described herein, but the invention is not limited to the embodiments described. For example, any device capable of rendering three-dimensional head shape and hair line data in an electronic form can be used as a stylus. The following claims demonstrate the breadth of the invention.

We claim:

1. A method of electronically defining three-dimensional data related to a human head, the method comprising:
   (a) tracing at least one characteristic of the head with a stylus that registers three-dimensional position data to create a three-dimensional data representation of the characteristic; and
   (b) storing the three-dimensional data in an electronic data file.

2. The method of claim 1, further comprising:
   (c) generating a three-dimensional electronic mesh defining a solid and continuous surface of the at least one characteristic of the human head.

3. The method of claim 1, wherein the at least one characteristic of the head is a hair line.

4. The method of claim 1, wherein the at least one characteristic of the head is a hair loss pattern.

5. The method of claim 1, wherein the at least one characteristic of the head is the shape of the head.

6. The method of claim 1, further comprising:
   (d) using the three-dimensional data to generate data specifying an accessory to be used on the head.

7. The method of claim 6, wherein the accessory is a hair piece.

8. The method of claim 1, wherein the electronic data file is readable by a computer controlled carving matching to cut a model of the at least one characteristic of the human head.

9. A system for electronically defining three-dimensional data related to a human head, the system comprising:
   a stylus-based electronic acquisition device for capturing data representing one or more characteristics of a human head; and software directed to:
   (i) collect the data on a computer-readable medium and generate a three-dimensional electronic mesh defining a solid and continuous surface of the human head; and
   (ii) use the three-dimensional data to electronically specify an area to be covered by an accessory to be used on the head.

10. The system of claim 9, wherein the one or more characteristics of the head is selected from the group of head shape data, a hair line, and a hair loss pattern.

11. The system of claim 9, wherein the accessory is a hair piece.

12. The system of claim 9, wherein the software is further directed to:
   (iii) create an electronic file specifying instructions for creating the accessory.

13. The system of claim 12, wherein the instructions for creating the accessory comprise information such as the shape of the human head, measurements related to the human head, and specifications of the area to be covered by the accessory.

14. The system of claim 9, wherein the electronic data is readable by a computer controlled carving matching to cut a model of the at least one characteristic of the human head.

* * * * *